(12) United States Patent
Nonclercq et al.

(10) Patent No.: US 7,973,788 B2
(45) Date of Patent: Jul. 5, 2011

(54) GRAPHICAL METHOD FOR NAVIGATING IN A DATABASE OF MODELED OBJECTS

(75) Inventors: Arnaud Nonclercq, Suresnes (FR); Guillaume Delarue, Courbevoie (FR)

(73) Assignee: Dassault Systemes, Suresnes Cedex (FR)

( * ) Notice: Subject to any disclaimer, the term of this patent is extended or adjusted under 35 U.S.C. 154(b) by 329 days.

(21) Appl. No.: 11/167,364

(22) Filed: Jun. 27, 2005

(65) Prior Publication Data
US 2006/0007229 A1    Jan. 12, 2006

(30) Foreign Application Priority Data

Jun. 28, 2004    (EP) .................................... 04076865

(51) Int. Cl.
*G06T 17/00* (2006.01)
*G06T 15/00* (2006.01)
(52) U.S. Cl. ........................ 345/420; 345/419
(58) Field of Classification Search .................... 700/97; 345/650
See application file for complete search history.

(56) References Cited

U.S. PATENT DOCUMENTS

| 5,606,654 | A | | 2/1997 | Schuur |
| 6,121,969 | A | * | 9/2000 | Jain et al. ...................... 715/850 |
| 6,122,634 | A | | 9/2000 | Brodsky et al. |
| 6,237,006 | B1 | | 5/2001 | Weinberg et al. |
| 6,609,122 | B1 | | 8/2003 | Ensor |
| 6,628,304 | B2 | | 9/2003 | Mitchell et al. |
| 6,750,864 | B1 | | 6/2004 | Anwar |
| 6,982,708 | B1 | | 1/2006 | Mah et al. |
| 2002/0054166 | A1 | | 5/2002 | Decombe |
| 2002/0145623 | A1 | | 10/2002 | Decombe |
| 2004/0010398 | A1 | * | 1/2004 | Noma et al. ...................... 703/1 |
| 2004/0036721 | A1 | | 2/2004 | Anderson et al. |
| 2004/0090472 | A1 | | 5/2004 | Risch |
| 2004/0181554 | A1 | | 9/2004 | Heckerman et al. |
| 2005/0248560 | A1 | * | 11/2005 | Agrawala et al. ............. 345/418 |
| 2005/0273730 | A1 | | 12/2005 | Card et al. |

(Continued)

FOREIGN PATENT DOCUMENTS

JP     10-21282 A    1/1998

(Continued)

OTHER PUBLICATIONS van den Berg, "Web-based collaborative modelling with Spiff", Sep. 2000, Thesis, Delft University of Technology.*

(Continued)

*Primary Examiner* — Daniel F Hajnik
(74) *Attorney, Agent, or Firm* — Baker & Hostetler LLP

(57) ABSTRACT

A relational database contains a set of data and relations between the data of the set. The data may be representative of three dimensional modeled objects. For navigating in the database, the user selects a first data and a first relation; the second data related to the first data according to the first relation are searched. Then, a three-dimensional representation of objects represented by the second data is displayed to the user. When the user selects one of the displayed objects and a second relation, the second data representative of the selected object is identified. Then, third data related to the identified second data according to the second relation are found. A three-dimensional representation of objects represented by the third data is then displayed.
The user may navigate in three-dimensional representations of the objects represented in the database, without any need to know and understand the structure of the database.

19 Claims, 9 Drawing Sheets

U.S. PATENT DOCUMENTS

2007/0018983 A1 1/2007 Vimme

FOREIGN PATENT DOCUMENTS

| JP | 2001-325294 A | 11/2001 |
| JP | 2003-524845 A | 8/2003 |
| KR | 10-2000-0072012 | 12/2000 |
| KR | 10-2002-0021074 | 3/2002 |
| KR | 10-2004-0005903 | 1/2004 |

OTHER PUBLICATIONS

Wilmot Li , Maneesh Agrawala , David Salesin, Interactive image-based exploded view diagrams, Proceedings of the 2004 conference on Graphics interface, May 17-19, 2004, London, Ontario, Canada.*

Elena Driskill , Elaine Cohen, Interactive design, analysis, and illustration of assemblies, Proceedings of the 1995 symposium on Interactive 3D graphics, Apr. 9-12, 1995, Monterey, California, United States.*

Milena Gateva Koparanova, Tore Risch, "Completing CAD Data Queries for Visualization," ideas,pp. 130, International Database Engineering and Applications Symposium (IDEAS'02), 2002.*

Stefan Brecheisen, Hans-Peter Kriegel, Peer Kröger, Martin Pfeifle, Maximilian Viermetz "Representatives for Visually Analyzing Cluster Hierarchies" (2003), In Proc. 4th Int. Workshop on Multimedia Data Mining (MDM/KDD'03).*

"Matrix One: Matrix Basics, Version 6", MatrixOne Inc., 1998, XP002308421, pp. 1-47.

Gomez, Julian E., et al., "The Digital Space Shuttle, 3D Graphics, and Knowledge Management", Proceedings of the Siggraph 2003 Conference on Sketches and Applications, in Conjunction with the $30^{th}$ Annual Conference on Computer Graphics and Interactive Techniques, Jul. 27, 2003, p. 1, XP002308422.

McKinney, Kathleen, et al., "Visualization of Construction Planning Information", 1998 International Conference on Intelligent User Intefaces, IUI '98, XP002111495, pp. 135-138.

Carriere, Jeromy, et al., "Research Report: Interacting with Huge Hierarchies: Beyond Cone Trees", Information Visualization, IEEE Comput. Soc, Oct. 30, 1995, pp. 74-81.

Hicks, B. J., et al., "An integrated modelling environment for the embodiment of mechanical systems", Computer-Aided Design, vol. 34, Issue 6, May 2002, pp. 435-451.

Robertson, G., et al., "Cone trees: animated 3D visualizations of hierarchical information". In Proc. CHI'91, Human Factors in Computing Systems, 1991, pp. 189-202.

European Search Report, Aug. 24, 2005.

Brecheisen, S. et al., "Representatives for Visually Analyzing Cluster Hierarchies", Inst. for Computer Science, Aug. 27, 2003, pp. 8 pages.

Eelco van den Berg, "Web-based Collaborative Modelling with SPIFF", Delft Univ. of Techy., Sep. 2000, pp. 1-52.

* cited by examiner

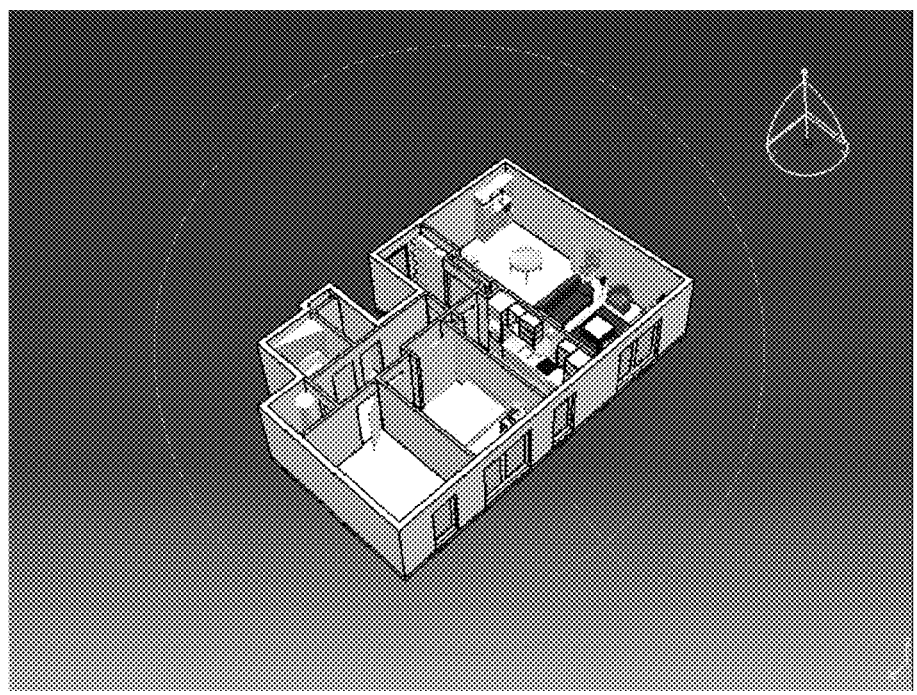
Fig. 3
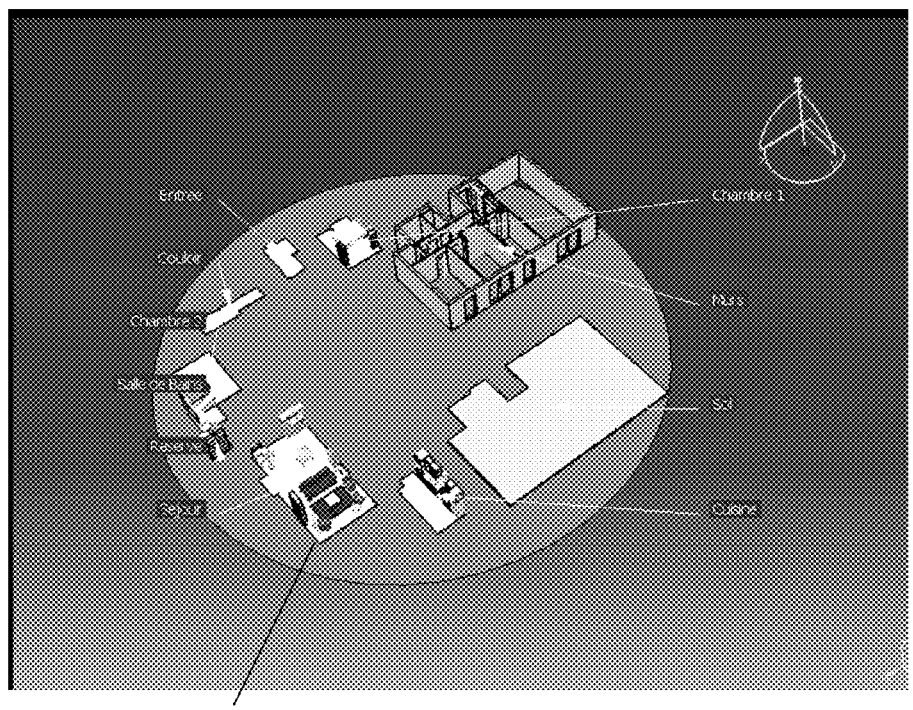
44    Fig. 4

GRAPHICAL METHOD FOR NAVIGATING IN A DATABASE OF MODELED OBJECTS

CROSS REFERENCE TO RELATED APPLICATIONS

This application claims priority to European patent application no. 04076865.7 filed on Jun. 28, 2004, which is currently pending.

FIELD OF THE INVENTION

The invention relates to the field of computer programs and systems, and more specifically to product life cycle management solutions, which contain databases of data representative of modeled objects.

BACKGROUND OF THE INVENTION

A number of systems and programs are offered on the market for the design of parts or assemblies of parts, such as the one provided by DASSAULT SYSTEMES under the trademark CATIA. These so-called computer-aided design (CAD) systems allow a user to construct and manipulate complex three-dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which a geometry is generated, and from geometry a representation is generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of a Mega-byte for part, and an assembly may comprise thousands of parts. A CAD system manages models of objects, which are stored in electronic files.

There also exist product life cycle management solutions (PLM), such as the one provided by DASSAULT SYSTEMES under the trademarks CATIA, ENOVIA and DELMIA; these solutions provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the systems deliver an open object model linking products, processes, and resources to enable dynamic, knowledge-based product creation and decision support that drives optimized product definition, manufacturing preparation, production and service. Such PLM solutions comprise a relational database of products. The database comprises a set of textual data and relations between the data. Data typically include technical data related to the products, said data being ordered in a hierarchy of data and are indexed to be searchable. The data are representative of the products, which are often modeled objects.

One of the problems in such PLM solutions is that the users of the system may wish to display the products and have a three dimensional graphic representation of the products. DASSAULT SYSTEMES provides under the name DMU Review a series of CAD tools for allowing the user of PLM solution to handle a three dimensional graphic representation of the products managed in the system. These tools rely on the use of digital mock-ups which are pre-computed from CAD representations of the products. These tools further provide a restricted set of graphic views of the products; specifically, as explained below in reference to FIG. 1, the DMU systems usually provide a three-dimensional representation of the products. In the system sold under the name DMU Navigator, the user may display a three dimensional representation of a complex product; the display further comprises a hierarchical tree representing the various products or parts of said displayed product. FIG. 1 is a view of a display in DMU Navigator. On the left hand side of the display appears a tree 2 which is representative of the database content. As represented in FIG. 1, the root level of the tree designates a complete assembly—in the example of FIG. 1, a car. The next level of the tree shows a series of subassemblies composing the root level product—the Conditioning System, the Engine, the Body, the GearBox, the Pedal System etc. There is also provided a series of applications. The display further shows a three dimensional representation of the product. The user may click on one of the subassemblies in the tree—for instance the Pedal System—and the system will then display a three dimensional representation of the selected subassembly. The user may expand the corresponding branch in the tree—by clicking on the "+" sign left of the subassembly for displaying the parts which compose a subassembly—for instance, the Braking Pedal in the Pedal System. Selecting one of the parts will again cause the system to display a three dimensional representation of the relevant part.

This system provides to the user three-dimensional representations of the products stored in the database. However, navigation in this system may still be improved. With CAD tools such as DMU review or DMU Navigator, the user is only able to navigate among the parts or the products that have been loaded in the system. Therefore, the scope of the navigation is very limited since if the user wishes to navigate among all the available products or assemblies, he has to load all those products or assemblies, which is impossible due to hardware constraints and transactions issues.

As a matter of fact, DMU products are limited with regards to the scope of navigation. Specifically, the user first opens a DMU session, where a limited list of parts and assemblies is defined. This makes it possible for the system to compute and store the representations that will thereafter be used in the DMU navigation. Navigation is limited to the list of parts and assemblies defined when the DMU session is opened.

Furthermore, the user may wish to know where the above mentioned Braking Pedal is also used, i.e. in which other models of car it is embedded. Actual CAD tools enable a user to navigate between parts or products mainly according to the "is composed of" relation. Databases used in Product Data Management (PDM) systems enable the user to make queries on all types of relation between parts or product and the scope of navigation of the databases is the widest possible. As a matter of fact, the user can have access to all the parts, products or assemblies.

Nevertheless, databases do not allow the user to easily navigate since the data do not have a graphical representation. Data are identified by file names or types and those names may not be relevant enough to identify precisely the items that the user is looking for.

Thus, there is a need for a solution allowing a user to navigate in a relational database representing modeled objects, especially in a database of products in a product lifecycle management system. The solution should preferably be user-friendly and should allow the user to locate and display products in an easy and intuitive way.

SUMMARY OF THE INVENTION

In one embodiment, the invention therefore provides a method for navigating in a database, the database comprising a set of data and relations between the data of the set, the method comprising the steps of:

selecting a first data and a first relation;
finding second data related to the first data according to the first relation;
displaying a three-dimensional representation of objects represented by the second data;
selecting one of the displayed objects and a second relation;
identifying, among second data, data representative of the selected object and finding third data related to the identified second data according to the second relation;
displaying a three-dimensional representation of objects represented by the third data.

One may provide that the set of data in the database comprises data representative of 3D modeled objects.

It is also possible that the displayed three-dimensional representation includes, between displayed objects, a graphical representation of a relation between the data representative of the displayed objects.

In one embodiment, the step of selecting a first data and a first relation comprises selecting a first layout, and the three-dimensional representation of objects represented by the second data is a representation in the first layout.

One may also provide that the step of selecting one of the displayed objects and a second relation comprises selecting a second layout, and that the three-dimensional representation of objects represented by the third data is a representation in the second layout.

Then, the layout may be selected among:

in-line layout, with objects represented in perspective view exploded along a line;
in-place layout;
in-disk layout, with objects represented in exploded perspective distributed on a disk;
2D layout of 3D miniature representations.

The layouts may also be animated.

One may provide that the relations comprise at least two of the following relations:

a relation "is comprised of";
a relation "where used";
a relation "in contact with";
a relation "in clash with";
a relation "impact with".

The method may further comprise a step of computing and storing three-dimensional representations of objects.

The invention also provides a database, comprising:

a set of data, representative of 3D modeled objects;
a set of relations between the data,
at least one three-dimensional representation of modeled objects;
a routine for navigating and visualizing said at least one three-dimensional representation of modeled objects.

Last, the invention provides a computer program implementing the method.

A system embodying the invention will now be described, by way of non-limiting example, and in reference to the accompanying drawings.

BRIEF DESCRIPTION OF THE FIGURES

FIGS. 3 to 8 are examples of views displayed in the process of FIG. 2.

DETAILED DESCRIPTION OF THE INVENTION

The invention applies to relational databases, such as the ones that are used in PLM solutions. Such databases, as well known to the person skilled in the art, comprise a set of data, as well as relations between the data of the set. The relations are often indexed, for the purpose of accelerating searches within the database. From a file standpoint, a relational database is not comprised of a single file but uses a complex file system for storing the various data and relations. The data in the database are representative of modeled objects.

In a PLM solution, the set of data would comprise, for example, for a product or for a modeled object:

part number;
manufacturing or procuring information on the product or modeled object;
references to drawings or CAD files for the products;
versioning (history of design iterations, history of released versions).

Figure 1:
FIG. 1 is an example of a display in a prior art system.

Relations in a PLM solution would comprise notably a "is comprised of" relation; this relation makes it possible to create clusters or subassemblies of products—such as the Pedal Systems subassembly displayed in FIG. 1. Relations could also comprise a relation "is used in", also called "where used" relation, which is representative of all subassemblies where a given product is used. Relations could also comprise a relation "is in contact with", which allow the user to manage contacts between the various products in the database. Relations may comprise the relation "in clash with", which indicates that the various data describe objects which overlap each other. This may help in finding design problems. Relations may comprise a part dependency; this relation is representative of the impact graph, when a part is built from another one, which is also known as "relational design". Last, relations may exist which are representative of attributes of the various data; these attributes may include usual attributes in PLM solution, e.g. the material forming the objects, the origin of the objects and the like.

In the example of FIG. 1, the relation "is composed of" would allow the system to provide the list of products in a subassembly, e.g. the list of products forming the Pedal System, or the list of subassemblies forming the Pedal system according to the number of levels in the system. In the same example, the relation "is used in" would provide, for a given product, the list of subassemblies where the product is used; for instance, starting from a bolt reference, the user could find in which subassemblies similar bolts are being used. The relation "in contact with" is self explanatory and further explanations are not needed.

The invention makes it possible for the user to navigate among the data, by displaying three-dimensional representations of the data. The displayed data are selected according to the various relations existing in the database.

Figure 2:
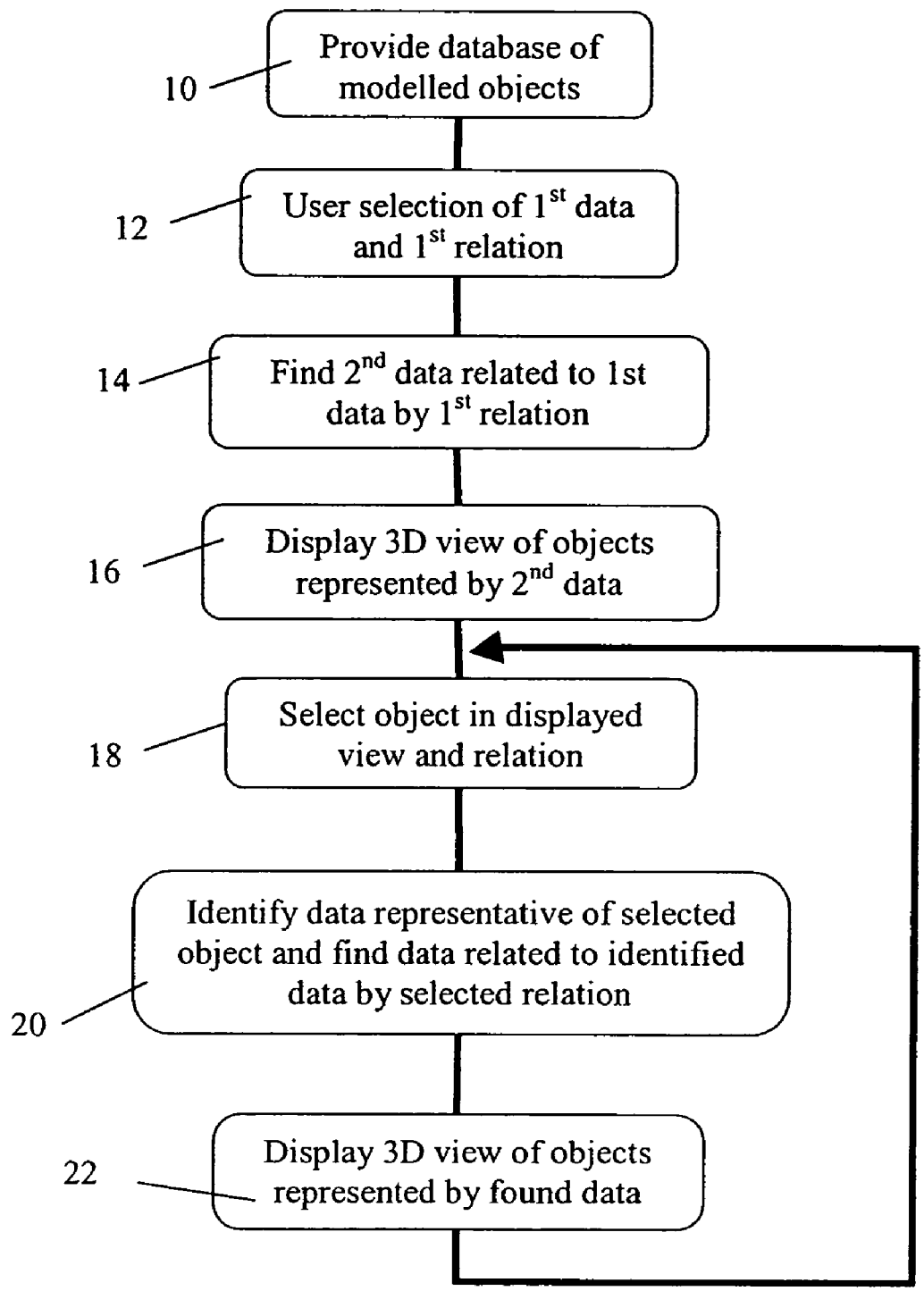
FIG. 2 is a flowchart of a process according to the invention.

FIG. 2 is a flowchart of a process according to the invention. FIGS. 3 to 7 are examples of the displays provided in the process of FIG. 2. The examples of FIGS. 3 to 7 relate to a database of the various products composing a flat—from walls and doors to furniture elements contained in the flat.

In step 10, the database is provided.

In step 12, the user selects a first data and a first relation. This may be done thanks to the use of a tree, such as the one of FIG. 1. It is also possible for the user to select the first data thanks to another type of user interface, for instance by inputting identification information for the first data, by selecting the first data in a list, or the like. The relation may be selected thanks to any kind of user interface such as a combo-box, an icon, a special command or a right click.

In response to the selection of the first data and first relation, the system displays a three dimensional representation of objects. The displayed objects are actually objects represented in the database by second data related to the first data according to the first relation. For this purpose, the system uses the relational property of the database for selecting all data in the database that are related to the first object in the first relation. Once the second data are identified in step 14, the modeled objects which are represented by these second data are displayed, as shown in step 16.

In the proposed example, the user could select a room in the flat and the relation "is composed of". In this case, the system would search the database for all data—parts or products—that compose the selected room. FIG. 3 shows a view of a selected room.

The three dimensional view may be one of various types or layouts, as represented in FIGS. 3 to 7.

As in the example of FIG. 3, it may be a usual three-dimensional representation of the object, as assembled; this may be called "in-place" layout. In the example of FIG. 3, the object is a flat.

Figure 8:
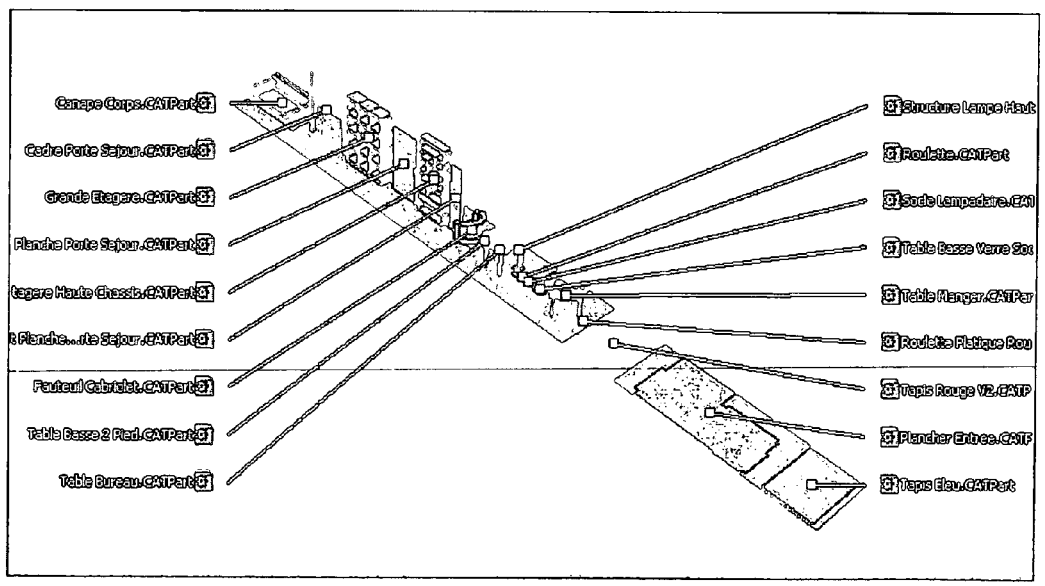

The various second data objects may be separated in an exploded perspective view; the layout may be exploded along a given line, the direction of which may be selected by the user; this may be called an "in-line" layout. The layout may be exploded along directions from a given point—e.g. a centroid of the represented assembly or part, or the center of the represented assembly or part. Such a layout makes it easier for the user to identify and select the various second data objects. A representation with an in-line layout is shown in FIG. 8.

As in the example of FIG. 4, second data objects may be distributed over a disk or circle—so as to obtain an "in-disk" layout; this layout eases the understanding of the model and also facilitates selection of further data. In the example of FIG. 4, the user selected the flat of FIG. 3 and the relation "is comprised of". The various elements forming the flat as displayed over a disk.

Figure 5:
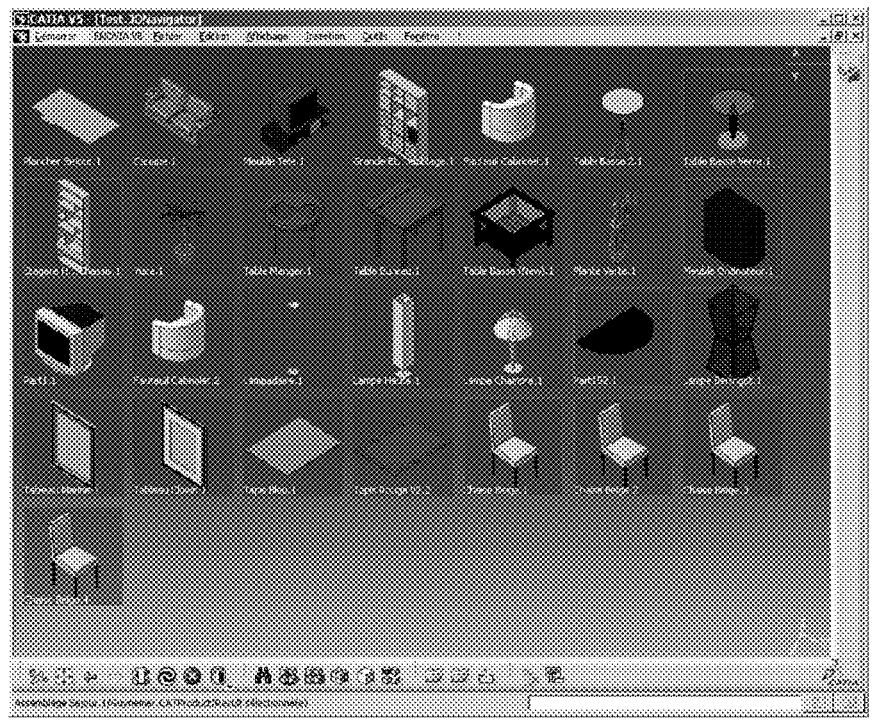

Another possible layout is a miniature layout of the various parts. One could for instance use a 2D layout of 3D miniature representations of objects. This is exemplified in the representation of FIG. 5, showing the various items from the living room of the flat represented in FIGS. 3 and 4.

The layouts may be animated. Thus, when the user changes the layout, or selects a given layout, the various objects move progressively. This helps in understanding the position of the various objects.

The type of layout displayed to the user may be preset or may be selected by the user. One advantageous solution is to allow the user to set a default type of view used for all displays. When a given layout is displayed, the user may then be allowed to change the default type of layout to another type.

In addition, the three dimensional representation of each parts or products may be pre-computed. This reduces computation time. Pre-computing the three dimensional representation is possible, at least for some of the representations that are expected to be repeatedly used in the database. This could for instance be the fact of three-dimensional representations of the subassembly. Such pre-computed representations may be computed off the fly and may be stored for access by the system. If a given three dimensional representation is to be displayed, it would first be searched among the representations already stored; if the representation to be displayed is not present, it would then be computed.

In step 18 of the process, the user selects one of the displayed second data and a second relation. The second relation may be the same as the first relation, which could be a default choice. The second relation may also be different from the first relation. Step 18 is thus similar to step 12; however, in step 18, selection is carried out directly on the 3D representation displayed to the user.

In step 20, as in step 14, third data related to the selected second data through the selected second relation are searched and identified. In step 22, a 3D representation of the third data is represented to the user, according to the selected layout.

Figure 6:
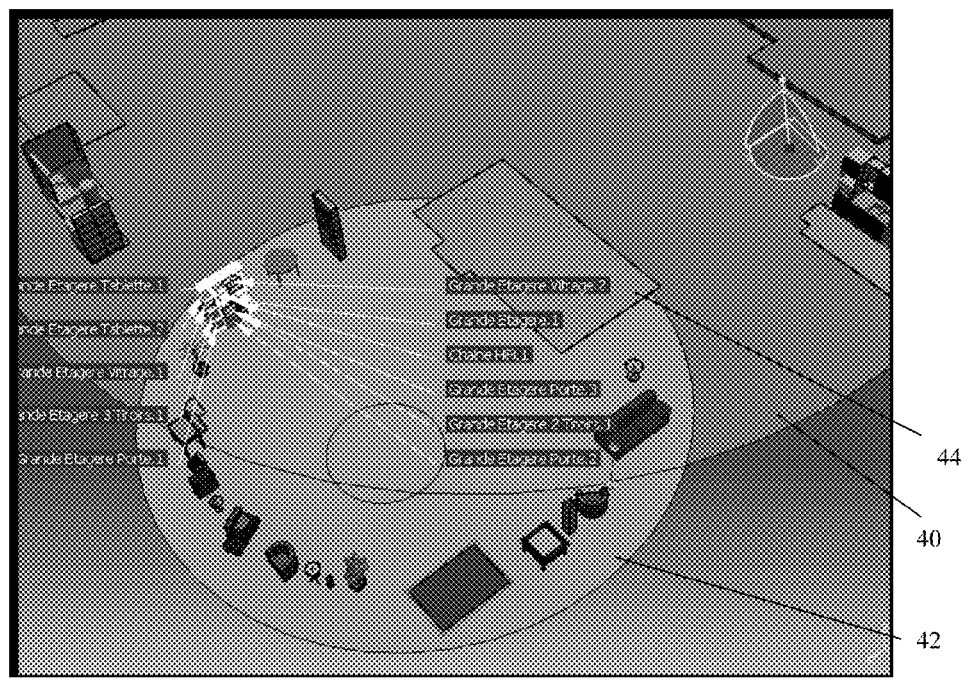

FIG. 6 shows an example of a user selection of second data and second relation. In the example, it is assumed that in step 16, the view of FIG. 4 was displayed to the user. The user selected the living room and the same relation "is comprised of". FIG. 6 shows the 3D representation displayed in step 22. Like the view of FIG. 4, the view of FIG. 6 shows a layout where the data distributed on a disk or circle. The large circle 40 is the same as the one displayed in FIG. 4. The smaller circle 42 is representative of the second relation. The view of FIG. 6 provides the user with an immediate understanding of the various relations between the displayed objects. This is ensured thanks to the fact that the selected relations are graphically represented on the 3D layout displayed to the user. More specifically, the view shows between the objects a graphical representation of the relation between the data representative of the objects.

Figure 7:
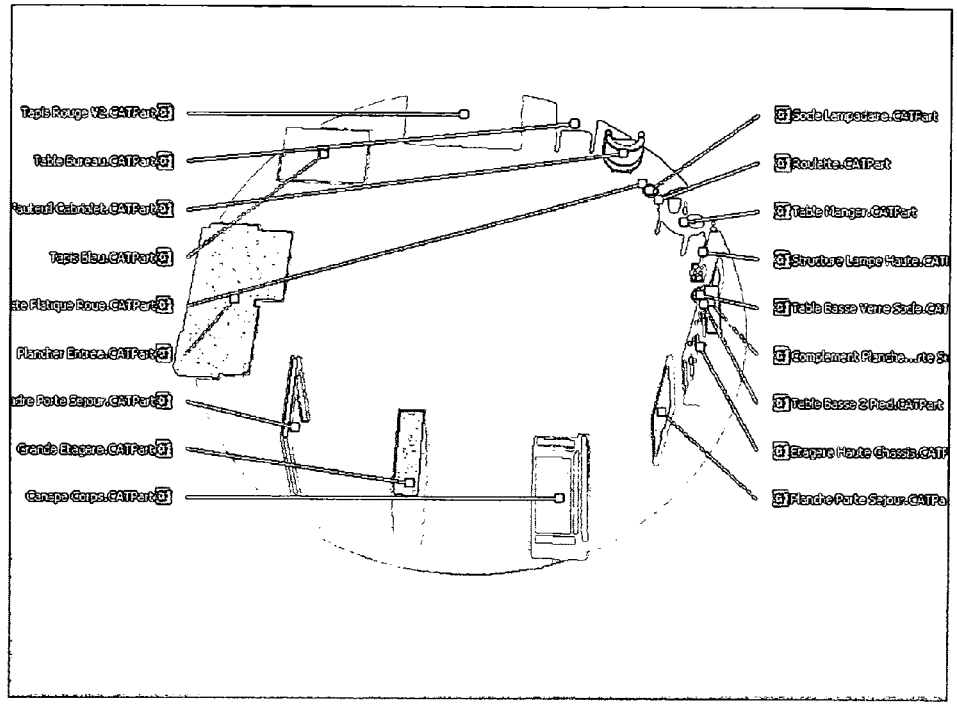

FIG. 7 shows another example of a user selection of second data and second relation. In the example, it is again assumed that in step 16, the view of FIG. 4 was displayed to the user. In step 18, the user selected the floor 44 of the living room and the relation "is in contact with" relation. The resulting view in FIG. 7 shows the various data or objects which are in contact with selected floor, with an "in-disk" layout.

FIG. 8 shows still another example of layout. In the example of FIG. 8, the displayed objects are laid out linearly, along an axis selected by the user. Specifically, the displayed objects are distributed over the axis selected by the user, and sorted along the axis; for instance, one may use for the sorting of objects the position of the center of their bounding box in the assembly. The view of FIG. 8 makes it possible for the user to intuitively understand the assembly of the various displayed objects. In the example of FIG. 8, the same objects as in FIG. 7 are displayed over a horizontal line.

After step 22, the process loops to step 18. This means that the user may again select some data on the displayed 3D view and may again select a new relation for displaying a new image.

The process makes it possible for the user to graphically navigate through the data contained in the database, while taking advantage of the various relations in this database. Compared to the prior art solutions, where the only usable relation is the relation "is comprised of", the invention allows navigation, even without prior knowledge of the database structure. Thus, some data—a given object—in the database may easily be found by the user of the system.

In addition, the 3D views displayed to the user may include a graphical representation of the relations. Compared to the prior art solution, where the relation "is comprised of" actually appears in a separate tree, the invention provides the user with an intuitive understanding of the various relations in the database.

The invention may be carried out as an add-on to existing database systems, such as PLM solutions. A possible implementation of the invention is now disclosed, in reference to FIGS. 9-14.

Figure 9:
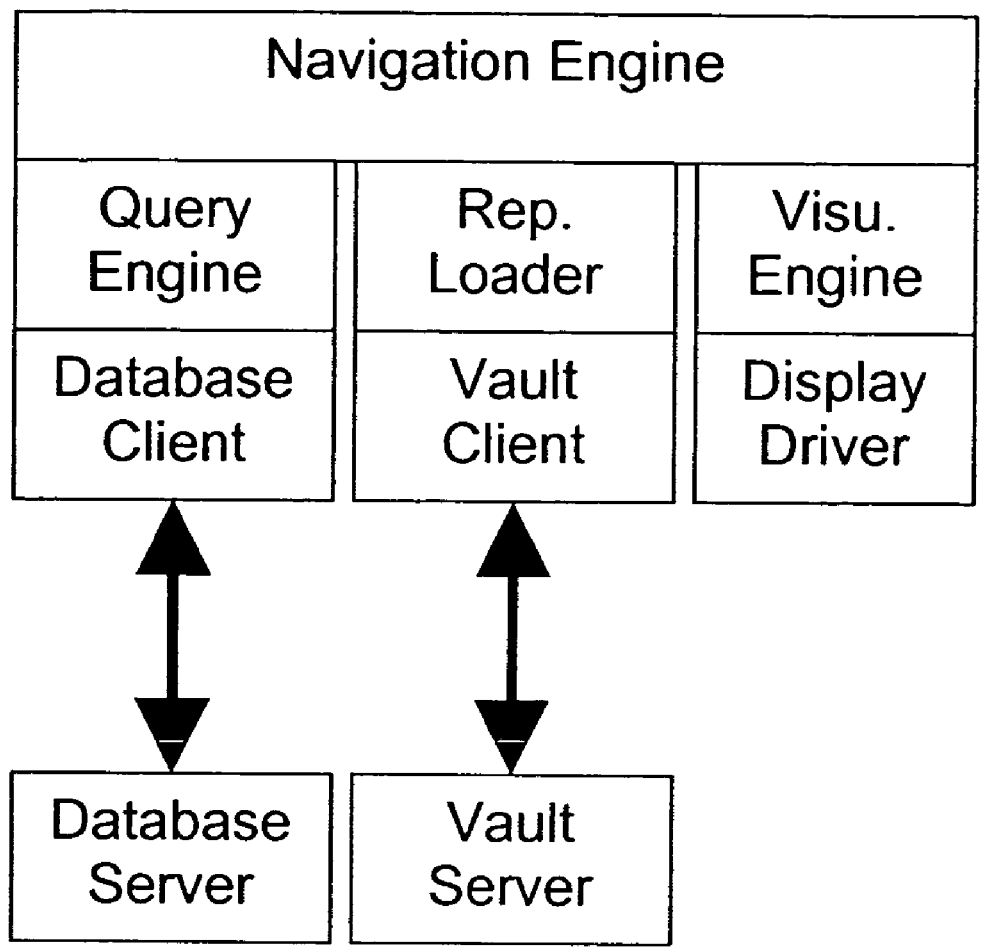
FIG. 9 is a schematic view of a software architecture usable for carrying out the invention.

FIG. 9 is a schematic view of a software architecture usable for carrying out the invention; it shows a single client, a database server 56 and a vault server. The client comprises a navigation engine 50, which manages user interface and controls components 52, 58 and 64. The navigation engine makes it possible for the user to select objects, relations, and, if available, types of layouts or views for displaying the objects. In addition, navigation engine may provide the usual types of queries available in a PLM system.

FIG. 9 further shows query engine 52, database client 54 and database server 56. Query engine 52 is controlled by navigation engine 50; it builds database statements depending on user's commands and passes the database statements to database client 54. Query engine 52 also manages query results received from database client 54.

Database client 54 is adapted to manage database server connection. It receives queries from query engine 52 and passes the queries to database server 56. It receives query results from database server 56 and passes these results to query engine 52.

Database server 56 receives queries from several database clients, such as client 54, and serves these queries. Database server is typically a relational database and may be implemented using the solutions available from IBM under reference DB2 or available from Oracle. The database could also be an object or XML database, or an application server accessing a database. Said application server may also provide processing (on the fly or asynchronously) for advanced query (proximity query, spatial query . . . ).

Apart from the additional graphical navigation functions available to the user in navigation engine 50, components 52, 54 and 56 need not differ from a relational database of the art, like the ones used in PLM solutions. Accordingly, these components are not detailed further.

FIG. 9 further shows a vault server 62, for storing and providing representations of objects contained in the database; in other words, the vault server is used as representations repository. Vault server 62 may be a file server, whereby representations could be stored in various files. It could also be implemented using a database server, using for instance "blob" (binary language object) storage. It could also use proxy and/or cache technologies. The representations of objects stored in the vault server may exists in various formats, e.g. bounding-box, polygons, bitmap images, vector images, subdivision surfaces or more generally any format known in the art. It is advantageous, as discussed below, to store various formats in the vault server, for allowing incremental loading of representations.

The vault server is addressed thanks to a vault client 60. The vault client makes it possible for the client to address the vault server for retrieving representations of objects. FIG. 9 also shows a representation loader 58. Representation loader 58 queries vault server 62, through vault client 60, for obtaining the representations of the objects to be displayed to the user. In addition, representation loader 58 manages representation incremental loading, upon receiving representations from vault client 60.

Visualization engine 64 manages representation display to the user. It addresses display driver 66, which manages the display hardware—the graphic card, in most instances. For the purpose of displaying representations on the display hardware, one may use accelerated hardware, through an OpenGL driver, or using Microsoft Direct 3D, or DirectX.

Figure 10:
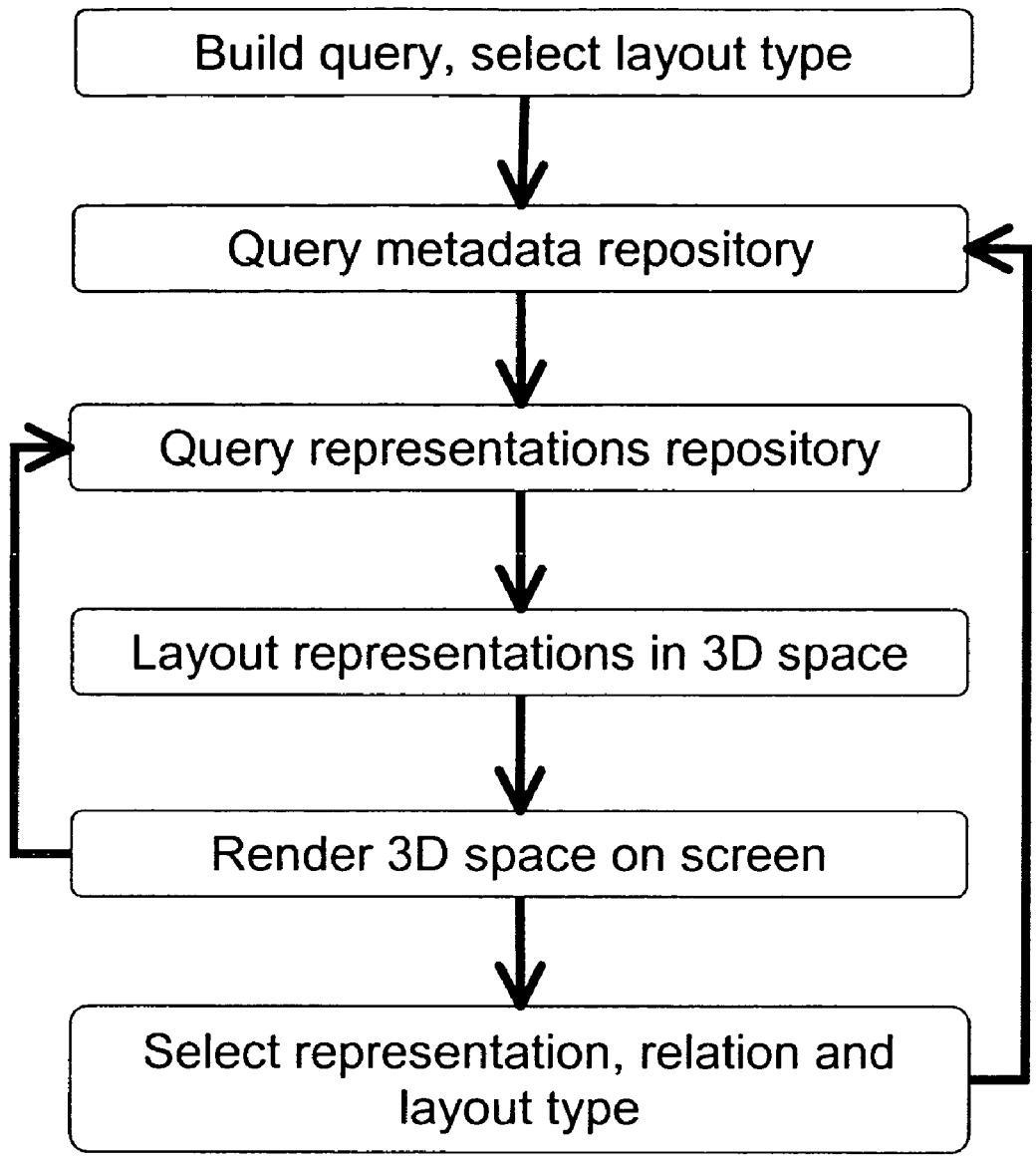
FIG. 10 is a flowchart of a process for building three dimensional representations for carrying out the invention.

FIG. 10 is a flowchart of a process for building a display according to the invention. The process uses the software architecture represented in FIG. 9. In steps 70-78, in response to the selection of the first data and first relation, the system displays a three dimensional representation of objects. In step 80, the user selects an object and a relation. Then, as depicted, the process of FIG. 10 loops to step 72 for building a new view to be displayed to the user.

More specifically, in step 70, a query is built and a layout type is selected. This may be carried out as discussed above in reference to step 12 of FIG. 2. Selection of the query and of the layout type is allowed by the user interface of the navigation engine 50 of FIG. 9. The layout type may be one of the various types of views exemplified in reference to FIGS. 3-7.

In step 72, the database is queried, for obtaining attributes of objects matching the query built in step 70. In the architecture of FIG. 9, this step would be carried out by navigation engine 50, query engine 52, database client 54 and database server 56. As a result of step 72, there is provided a set of attributes of objects, which need to be displayed.

In step 74, the vault server is queried for obtaining the various representations of the objects, which need to be displayed. In the architecture of FIG. 9, this step would be carried out by navigation engine 50, representation loader 58, vault client 60 and vault server 62. As a result of step 74, there is provided a set of representations which correspond to the various objects to be displayed, in the select layout.

In step 76, the representations are laid out in 3D space, according to the selected layout and according to the information retrieved from the database server. In the architecture of FIG. 9, this could be carried out by navigation engine 50 and visualization engine 64. The laid-out representation is displayed to the user, in step 78, thanks to the display driver 66.

The process may then loop through steps 74, 76 and 78, for incrementally loading representations, from the small and poor formats to big and rich formats. For instance, one could first load bounding-box representations of the objects, before loading polygon representations of the objects. One could also stream representations. This makes it possible to provide to the user an almost immediate representation of the objects; even though this representation may first have a rather poor quality, the representation improves as time passes. The user is eventually provided with a more complete representation with a higher quality, without having to wait for a long time for such a representation. One may load representations as a background task, using multi-threading or asynchronous inputs/outputs. These solutions make it possible to give higher priority to database queries, so that navigation in the database does not hinder the user's work within the database.

The loop through steps 74, 76 and 78 may stop when the best and richer representations are loaded and displayed to the user.

Else, the loop through these steps may cease when the user selects one of the displayed objects and a relation; this step is represented in FIG. 10 under reference 80; it corresponds to step 18 of FIG. 2. The process then loops back to step 72, where the database server is again queried.

The process of FIG. 10 and the architecture of FIG. 9 use a vault server, where various pre-computed representations of the data are stored.

Figure 11:
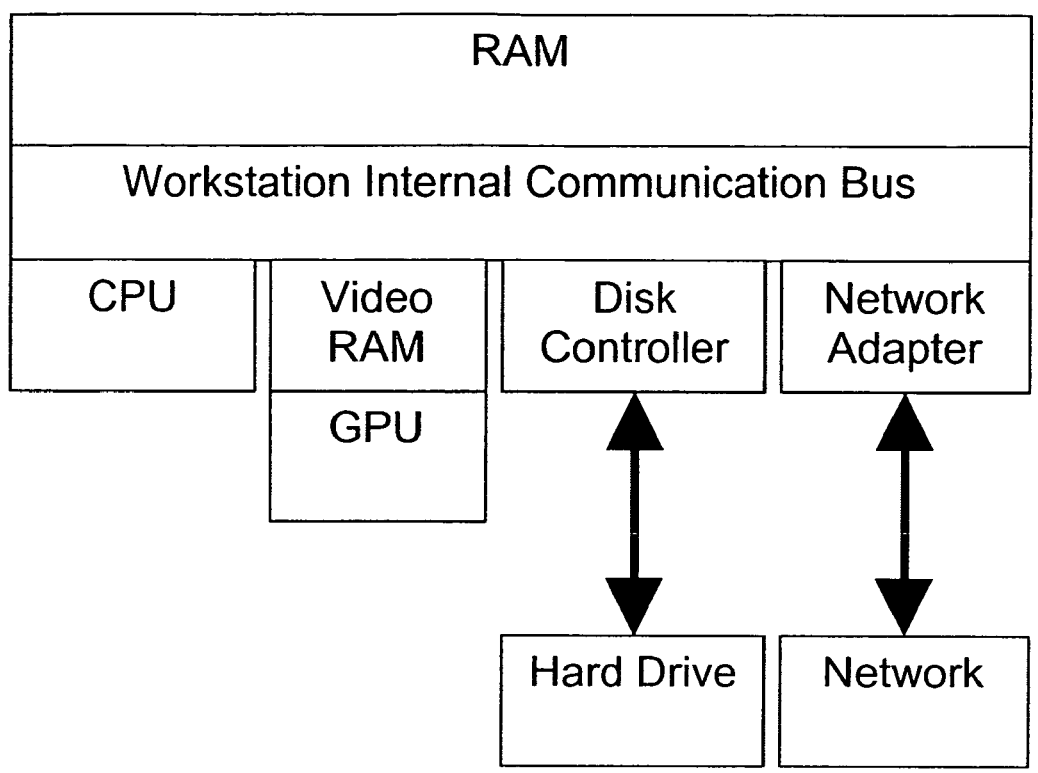
FIG. 11 is a schematic view of a client workstation architecture adapted for carrying out the invention.
Figure 12:
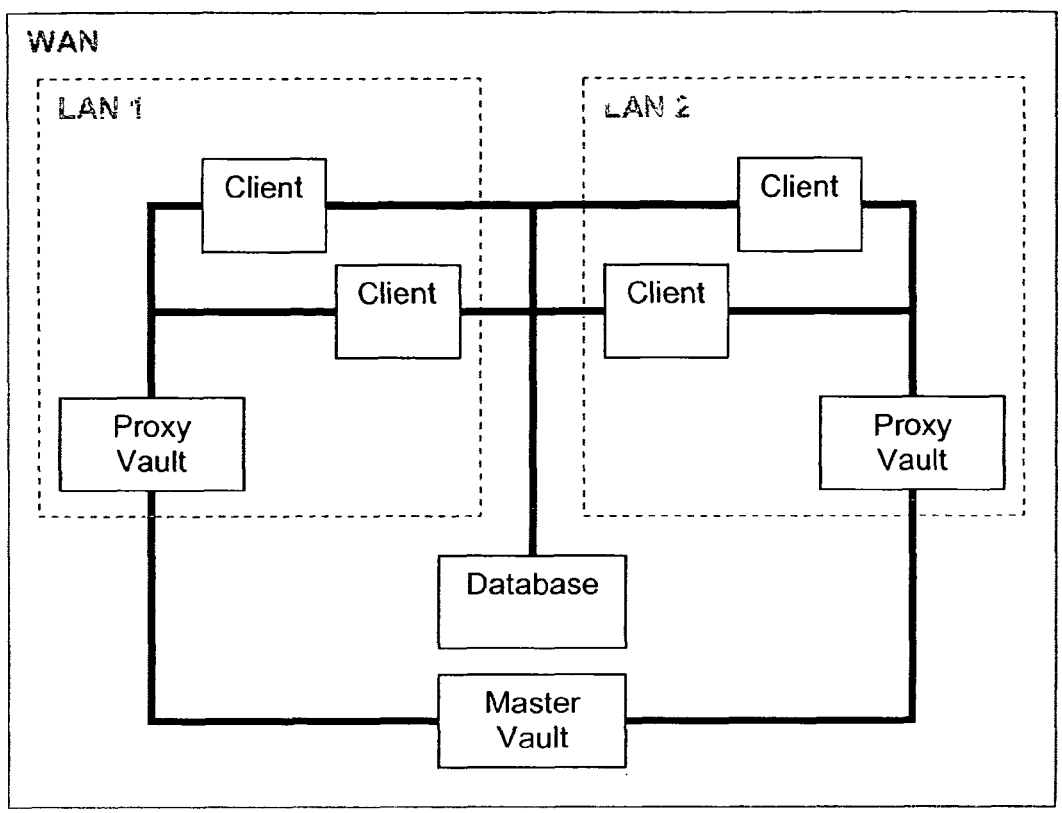
FIG. 12 is a schematic view of a network architecture adapted for carrying out the invention.

FIGS. 11 and 12 are schematic views of client and network hardware architecture, adapted for carrying out the invention. FIG. 11 shows a client workstation. The workstation comprises a central processing unit 90, a random access memory 92 and a workstation internal communication bus 94 for allowing access to the random access memory. The workstation is further provided with a graphical processing unit 96, with its associated video random access memory 98. A disk controller 100 manages accesses to a mass memory device, such as hard drive 102. A network adapter 104 manages accesses to a network 106.

In operation, the various client components of FIG. 9 are processes executed in CPU 90. Network adapter 104 is used by vault client 60 for accessing vault server 62 on network 106 and is further used by database client 54 for accessing database server 56 on network 106. Disk controller 100 may be used by vault client to create a cache of representations on local mass memory device 102; this improves performances of frequently used representations. Display driver 66 feeds video RAM 98 with the layout of representations; these are displayed thanks to the GPU 96.

Query engine 52 processes queries and stores results in RAM 92. Representation loader 58 processes and stores working format of representations in RAM 92. The stored representations are used by display driver 66 as explained in reference to step 76 and are sent to the display driver 66.

FIG. 12 is a schematic view of a network architecture adapted for carrying out the invention; the architecture of FIG. 12 is adapted for allowing various users to navigate, thanks to a common vault server providing a generally accessible database of representations and thanks to a common database server. In the example of FIG. 12, two local area networks 110 and 112 are connected in a wide area network 114. FIG. 12 shows database 116 and master vault 118, which are depicted in WAN 114, for access from LANs 110 and 112. First LAN 110 comprises two clients 120 and 122, as well as a proxy vault 124. Second LAN 112 also comprises two clients 126 and 128 and a proxy vault 130. The master vault 118 is replicated in each proxy vault 124, 130, to optimize WAN bandwidth usage.

In operation, clients in one of LANs 110 and 112 access database 116 through WAN 114. Clients 120 and 122 in first LAN 110 access proxy vault 124 for getting representations, while clients 126 and 128 in second LAN 112 access proxy vault 130 for getting representations. This exemplary operation assumes that queries to the database 116—which are mostly text queries, as discussed above in reference to PLM solutions—may be served within WAN. WAN thus has sufficient bandwidth for serving requests to database 116. Since database 116 may be updated by any of the clients, the solution of FIG. 12 is simpler than managing data update in various database proxies. The operation of FIG. 12 optimizes WAN bandwidth usage, by replicating vault server 118 into proxy vaults 124 and 130. This is advantageous, since representations of data will typically have a larger size than database information; in addition, representations are pre-computed, and need not be updated, contrary to database information.

The invention is not limited to the preferred embodiments described in reference to the drawings. Notably, the words "first", "second" and "third" data or relation, in reference to FIG. 2, are used for the sake of clarifying the description and do not represent any actual qualification of the data and relations.

Examples of views are provided in FIGS. 3-8. One may use other examples of layouts. FIGS. 9, 11 and 12 show suggested preferred architectures; one may also use other software or hardware solutions.

The invention claimed is:

1. A method of navigating a database, the method comprising the steps of:
    accessing a database using a computer, said database comprising a set of data and a plurality of relations between the data of the set, wherein the set of data in the database comprises data representative of modeled objects and the plurality of relations between the data of the set are determined based on relational properties of the database; and
    graphically navigating said database by:
        selecting, based on a first user selection, a first data and selecting, based on a second user selection, a first relation among a plurality of relations;
        finding in the database second data related to the first data according to the selected first relation;
        displaying a three-dimensional representation of modeled objects represented by the second data;
        selecting, based on a third user selection, one of the displayed three-dimensional representation of objects and, based on a fourth user selection, a second relation among the plurality of relations, the selection of said one of the displayed three-dimensional representation of objects being carried out directly on the three-dimensional representation displayed;
        identifying, among the second data, data representative of the selected one of the displayed three-dimensional representation of objects and finding in the database third data related to the identified second data according to the selected second relation; and
        displaying a three-dimensional representation of modeled objects represented by the third data.

2. The method of claim 1, wherein the set of data in the database comprises data representative of 3D modeled objects.

3. The method of claim 1, wherein a displayed three-dimensional representation includes, between displayed objects, a graphical representation of a relation between the data representative of the displayed objects.

4. The method of claim 1, wherein the steps of selecting the first data and the first relation further comprise selecting a first layout, and wherein the three-dimensional representation of objects represented by the second data is a representation in the first layout.

5. The method of claim 4, wherein the steps of selecting one of the displayed objects and the second relation further comprise selecting a second layout, and wherein the three-dimensional representation of objects represented by the third data is a representation in the second layout.

6. The method of claim 4, wherein the first and second layouts are selected among:
    in-line layout, with objects represented in perspective view exploded along a line;
    in-place layout;
    in-disk layout, with objects represented in exploded perspective distributed on a disk; and
    2D layout of 3D miniature representations.

7. The method according to claim 6, wherein the first and second layouts are animated.

8. The method of claim 1, wherein the first and second relations comprise at least two of the following relations:
a relation "is comprised of";
a relation "where used";
a relation "in contact with";
a relation "in clash with"; or
a relation "impact with".

9. The method of claim 1, further comprising a step of computing and storing three-dimensional representations of objects.

10. A computer system comprising:
a database, comprising:
a set of data, representative of 3D modeled objects,
a plurality of relations between the data, the plurality of relations between the data of the set being determined based on relational properties of the database, and
at least one three-dimensional representation of modeled objects; and
a computer processor adapted to:
access said database; and
graphically navigate said database by:
selecting, based on a first user selection, a first data and selecting, based on a second user selection, a first relation among the plurality of relations;
finding in the database second data related to the first data according to the selected first relation;
displaying a three-dimensional representation of modeled objects represented by the second data,
selecting, based on a third user selection, one of the displayed three-dimensional representation of objects and, based on a fourth user selection, a second relation among the plurality of relations, the selection of said one of the displayed three-dimensional representation of objects being carried out directly on the three-dimensional representation displayed;
identifying, among the second data, data representative of the selected one of the displayed three-dimensional representation of objects and finding in the database third data related to the identified second data according to the selected second relation; and
displaying a three-dimensional representation of modeled objects represented by the third data.

11. A method for deploying a relational database on a storage vault with computer instructions or data for a computer, the method comprising:
accessing a first database on storage vault, said first database comprising a set of data and a plurality of relations between the data of the set, wherein the set of data in the first database comprises data representative of modeled objects and the plurality of relations between the data of the set are determined based on the relational properties of the database; and
graphically navigating said first database by:
selecting, based on a first user selection, a first data and selecting, based on a second user selection, a first relation among the plurality of relations;
finding second data related to the first data according to the first selected relation;
displaying a three-dimensional representation of modeled objects represented by the second data;
selecting, based on a third user selection, one of the displayed three-dimensional representation of objects and, based on a fourth user selection, a second relation among the plurality of relations, the selection of said one of the displayed three-dimensional representation of objects being carried out directly on the three-dimensional representation displayed;
identifying, among the second data, data representative of the selected one of the displayed three-dimensional representation of objects and finding in the database third data related to the identified second data according to the selected second relation; and
displaying a three-dimensional representation of modeled objects represented by the third data.

12. The method of claim 11, wherein the set of data in the database comprises data representative of 3D modeled objects.

13. The method of claim 12, wherein a displayed three-dimensional representation includes, between displayed objects, a graphical representation of a relation between the data representative of the displayed objects.

14. The method of claim 11, wherein the storage instructions for causing the computer to select the first data and the first relation comprise selecting a first layout, and wherein the three-dimensional representation of modeled objects represented by the second data is a representation in the first layout.

15. The method of claim 14, wherein the storage instructions for causing the computer to select one of the displayed three-dimensional representation of modeled objects and the second relation comprise selecting a second layout, and wherein the three-dimensional representation of modeled objects represented by the third data is a representation in the second layout.

16. The method of claim 14, wherein the first and second layouts are selected among:
in-line layout, with objects represented in perspective view exploded along a line; in-place layout;
in-disk layout, with objects represented in exploded perspective distributed on a disk; 2D layout of 3D miniature representations.

17. The method according to claim 16, wherein the first and second layouts are animated.

18. The method of claim 11, wherein the first and second relations comprise at least two of the following relations:
a relation "is comprised of";
a relation "where used";
a relation "in contact with";
a relation "in clash with";
or a relation "impact with".

19. The method of claim 11, further comprising storage instructions for causing the computer to compute and store three-dimensional representations of modeled objects.

* * * * *